United States Patent [19]

Clayton et al.

[11] 4,238,402
[45] Dec. 9, 1980

[54] REACTIONS OF CHLOROSILANES AND METHOXYSILANES WITH CHLOROSILOXANES, METHOXYSILOXANES AND SILOXANES

[75] Inventors: Harold J. Clayton, Watervliet; Theodore A. Kulpa, Castleton; George F. Roedel, Schenectady, all of N.Y.

[73] Assignee: General Electric Company, Waterford, N.Y.

[21] Appl. No.: 45,704

[22] Filed: Jun. 5, 1979

[51] Int. Cl.$^3$ ............................................... C07F 7/18
[52] U.S. Cl. ...................................................... 556/434
[58] Field of Search ................................ 260/448.8 R

[56] References Cited

U.S. PATENT DOCUMENTS

| | | | |
|---|---|---|---|
| Re. 29,760 | 9/1978 | Brown et al. | 260/448.8 R X |
| 2,415,389 | 2/1947 | Hunter et al. | 260/448.8 R X |
| 2,637,719 | 5/1953 | Dereich | 260/448.8 R X |
| 3,433,764 | 3/1969 | Walmsley | 260/448.8 R X |
| 3,792,071 | 2/1974 | Nitzsche et al. | 260/448.8 R |
| 3,846,358 | 11/1974 | Roedel | 260/448.8 R X |
| 4,032,557 | 6/1977 | Spörk et al. | 260/448.8 R X |
| 4,160,858 | 7/1979 | Roedel | 528/14 |

*Primary Examiner*—Paul F. Shaver
*Attorney, Agent, or Firm*—John L. Young; E. Philip Koltos; Michael J. Doyle

[57] ABSTRACT

Reactions of chlorosilanes and methoxysilanes with chlorosiloxanes, methoxysiloxanes and siloxanes are carried out in the presence of hydrochloric acid and methanol, without the addition of any catalyst, to provide methoxy-functional polysiloxane intermediate fluids. Improved yields are provided by utilizing the hydrolyzate forms of $Me_2SiCl_2$ and $MeHSiCl_2$, respectively, in order to obtain $Me_2SiO$ and $MeHSiO$ siloxane units.

6 Claims, No Drawings

REACTIONS OF CHLOROSILANES AND METHOXYSILANES WITH CHLOROSILOXANES, METHOXYSILOXANES AND SILOXANES

BACKGROUND OF THE INVENTION

The present invention relates to reactions of chlorosilanes and/or methoxysilanes with polysiloxanes which are particularly well suited for formulating intermediate silicone fluids and which may be used to methoxylate silicone rubber process aids.

Useful randomization reactions of chlorosilanes and/or methoxysilanes with chlorosiloxanes, methoxysiloxanes and siloxanes have been observed to occur without the addition of catalyst. Hydrochloric acid is present and presumably plays a significant role in the randomization reaction by breaking siloxane bonds and thus promoting rearrangements. It may be proper to refer to HCl as a catalyst since none of it is consumed during the overall reaction. However, it is of greater significance that no additional catalyst need be added to promote these reactions.

The use of acids to polymerize organosiloxanes and the scission and reformation of siloxane bonds is reviewed by W. Noll in the Chemistry and Technology of Silicones, Academic Press, 1966, pp. 219-226.

Of specific interest is the direct reaction of chlorosilanes and methoxysilanes with siloxanes. It is well-known that an equilibrium mixture of $\alpha,\omega$-dichloropolydimethylsiloxanes can be produced by the reaction $Me_2SiCl_2$ (wherein Me represents methyl groups, $-CH_3$) with octamethylcyclotetrasiloxane in the presence of $FeCl_3 \cdot 6H_2O$ as follows:

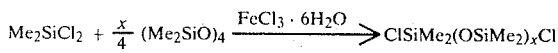

$$Me_2SiCl_2 + \frac{x}{4}(Me_2SiO)_4 \xrightarrow{FeCl_3 \cdot 6H_2O} ClSiMe_2(OSiMe_2)_xCl$$

The reaction will occur at room temperature or may be accelerated with mild heat such as by stirring at 50° C. for 6 hours. This reaction is useful for preparing polysiloxane intermediates which can be incorporated into block copolymers or converted into rubber process aids.

Rearrangement and polymerization reactions of siloxanes in the presence of hydrogen chloride and aqueous hydrogen chloride as well as reactions between chlorosilanes and siloxanes can also be found in the art. Reactions between chlorosilanes and siloxanes which are used to prepare linear polychlorosiloxanes, are promoted by heat, pressure, presence of HCl, or the introduction of Lewis acid catalysts. Reactions of chlorosilanes and siloxanes as described in the patent literature may also be catalyzed by such compounds as phosphine oxides and amine N-oxides in polar solvents. From a practical point of view, addition of a catalyst has the significant advantage of rate acceleration under moderate process conditions but there remains a major disadvantage for many siloxane systems, namely, it is often very difficult to ultimately remove the catalyst or neutralize its effect. Residual catalyst can affect the ultimate properties of silicones. For example, the thermal life of some silicone resins may be reduced by the presence of residual iron salt catalyst exceeding about 5 to 10 ppm.

The customary process for preparing methoxy functional intermediate silicone fluids has involved adding $MeOH-H_2O$ to a blend of chlorosilanes and then heating the mixture to reflux in order to drive the reaction toward completion, while removing dissolved HCl. The HCl content may be further reduced by washing with methanol; and finally the product is stripped in the presence of Celite and calcium carbonate by heating under reduced pressure. When this processing approach was used with a blend of 30 mole percent $C_6H_5SiCl_3$ and 70 mole percent $Me_2SiCl_2$, a reduction in yield of approximately 8 to 10 percent was obtained when compared to yields obtained with a blend having a composition of $C_6H_5SiCl_3$, $33\frac{1}{3}$ mole percent; $Me_2SiCl_2$, $33\frac{1}{3}$ mole percent; and $(C_6H_5)_2SiCl_2$, $33\frac{1}{3}$ mole percent. The loss in yield may be attributable to stripping losses of volatile methoxydimethylsiloxanes formed in the process. The present invention provides a process which has an improved yield when compared to the above. The improvement is obtained through the interaction of combining the $C_6H_5SiCl_3$ with the "hydrolyzate of $Me_2SiCl_2$" rather than with ordinary $Me_2SiCl_2$.

Hydrolyzate of $Me_2SiCl_2$ refers to the product of $Me_2SiCl_2$ when it is hydrolyzed in a continuous loop fashion. The hydrolyzate contains approximately 60% $(CH_3)_2SiO$ cyclic siloxane molecules of which $[(CH_3)_2SiO]_4$ and $[(CH_3)_2SiO]_5$ are the major components. The remaining 40% is composed of silanol chain-stopped linear oligomers. The silanol level, however, generally does not exceed about 0.1 to 0.2% by weight. Use of the hydrolyzate of $Me_2SiCl_2$ has some additional advantage in producing resins, since by-product hydrochloric acid from continuous loop hydrolysis of $Me_2SiCl_2$ can be more readily recovered and recycled than the hydrochloric acid generated by $Me_2SiCl_2$ in general resin processing.

Analogously, the "hydrolyzate of $MeHSiCl_2$" is a useful substitute for $MeHSiCl_2$ in reactions for producing silicone polymers containing MeHSiO units.

It is therefore an object of the present invention to provide a novel process for the formulation of methoxy functional silicone intermediate fluids.

Another object is to provide a process for preparing methoxy chainstopped polydimethylsiloxane polymers.

Another object is to provide a process for preparing methoxy chainstopped polysiloxane polymers containing $(C_6H_5)SiO_{1\frac{1}{2}}$ and MeHSiO units.

It is another object of the present invention to provide useful reactions of chlorosilanes and methoxysilanes with siloxanes without the addition of any catalyst nor with the need for carrying out these reactions in cumbersome pressure vessels.

SUMMARY OF THE INVENTION

This invention relates to a process for preparing methoxy stopped polysiloxane polymers. These polymers which can be comprised of a single species or a plurality of species, are liquids having a viscosity from, approximately, 1 to 5000 centipoise at 25° C. and which contain an average of from, approximately, 1.0 to 2.0 silicon bonded organic radicals per silicon atom. The silicon bonded organic radicals are selected from monovalent hydrocarbon radicals, halogenated monovalent hydrocarbon radicals, and cyanoalkyl radicals, with the organic radicals being attached to silicon through silicon to carbon linkages. The methoxy content of these products can range from, approximately, 2.0 to 30 percent by weight.

The preferred organo radicals in the organopolysiloxane employed in the practice of this invention are methyl (Me) and phenyl (Ph) radicals.

Compositions provided by the present invention also include those having hydrogen attached to silicon, with an average of, approximately, 0.001 to 0.1 hydrogen radicals per silicon atom along the siloxane chain. These materials can be further processed to form copolymers by the addition of unsaturated organic compounds to the siliconhydrogen bond through well-known reactions.

The compositions of the present invention are prepared by reacting mixtures of organo chlorosilanes and/or methoxysilanes with chlorosiloxanes, methoxysiloxanes and siloxanes in the presence of HCl and methanol, to form useful silicone intermediate fluids. These compositions can comprise a plurality of species which contain an average of from, approximately, 0.1 to 2.0 silicon bonded chlorine radicals per silicon atom and from, approximately, 0.1 to 2.0 silicon bonded methoxy radicals per silicon atom.

Reaction of the intermediate is promoted by heat, pressure and hydrochloric acid. The concentration of HCl in the reaction mix is fixed by the solubility at the operating conditions of temperature and applied pressure. The pressure can range from, approximately, 10 psi to 30 psi absolute with the preferred being existing atmospheric pressure. The reaction temperature can range from, approximately, 40° to 150° C. The preferred temperature for a particular reaction is at or below the atmospheric boiling point of the reaction mix.

DESCRIPTION OF THE PREFERRED EMBODIMENT

A process for preparing methoxy chainstopped polydimethylsiloxane polymer having a viscosity of, approximately, 1 to 5000 centipoise at 25° C. and a methoxy content of, approximately, 2 to 30 weight percent comprises the steps of charging 100 parts by weight of $(CH_3)_2SiCl_2$ to a reaction vessel and adding, approximately, 4 to 20 parts by weight of water to form a $\alpha,\omega$-dichloropolydimethylsiloxane intermediate fluid. The concentration of dissolved HCl in the reaction mixture can be reduced by heating the mixture.

An additional amount of $(CH_3)_2SiCl_2$ may then be added to adjust the viscosity and chlorine content of the siloxane intermediate fluid in order to bring it within desired preselected specification levels. When the intermediate fluids do not meet specification, it is impossible to produce the desired methoxy functional polysiloxane products. The present invention provides a process for restoring these intermediate fluids to preselected specification levels and thus, it is possible to salvage out-of-specification materials which would otherwise be useless.

The reaction vessel is heated to, approximately, 50° to 100° C. for approximately 4 to 8 hours, whereupon methanol is added and stirred for an additional amount of time of from, approximately, 0.5 to 2 hours at approximately 35° C. to 40° C. Thereafter, an immiscible MeOH-HCl phase can be removed. If desired, the reaction mixture may be stripped at, approximately, 120° to 160° C. at approximately 100 to 250 mm Hg pressure.

A process for preparing methoxy functional intermediates which are useful as components of copolymer paint vehicles and other products, is provided by the present invention and comprises the steps of adding 100 parts by weight of $(C_6H_5)SiCl_3$ to a reaction vessel containing, approximately, 65 to 105 parts by weight of dry $Me_2SiCl_2$ hydrolyzate and heating the reaction mixture for, approximately, 1 to 3 hours at, approximately, 110° to 130° C. The reaction mixture is then cooled to, approximately, 20° to 30° C. whereupon a preblend comprising, approximately, 31 to 41 parts by weight methanol and, approximately, 1 to 4 parts by weight of water is gradually added to the reaction mixture. The reaction mixture is then refluxed for, approximately, 0.5 to 2 hours and the acidity of the reaction mixture can be reduced by adding methanol and stripping in the presence of a drying agent such as a mixture of Celite and $CaCO_3$ at, approximately, 140° to 160° C. and, approximately, 75 to 125 mm Hg.

A process for preparing a methoxy chainstopped polysiloxane containing $(C_6H_5)SiO_{1\frac{1}{2}}$ and MeHSiO units useful for copolymerization with unsaturated organic resins such as polybutadiene polymer comprises the steps of adding to 100 parts by weight of $(C_6H_5)SiCl_3$ in a reaction vessel approximately 45 to 48 parts by weight methanol whereupon the mixture is refluxed for, approximately, 10 to 30 minutes. Approximately 7 to 12 parts of additional methanol is added and the mixture is stripped at, approximately, 90° to 120° C. at atmospheric pressure. Approximately 28 to 85 parts by weight of stripped hydrolyzate of $CH_3HSiCl_2$ is then added to the reaction mixture which is then heated for, approximately, 1 to 3 hours at, approximately, 110° to 125° C. to form a methoxy chainstopped product containing $PhSiO_{1\frac{1}{2}}$ and MeHSiO units. Note that Ph represents a phenyl group and has the formula $—C_6H_5$.

If desired, the mixture may be stripped at, approximately, 140° to 160° C. at 50 to 120 mm Hg pressure to obtain a final product having a viscosity of from, approximately, 5 to 40 centipoise at 25° C. and a methoxy content of, approximately, 15 to 22 weight percent.

EXAMPLE 1

A methoxy chainstopped dimethylsiloxane was produced by adding water to 110.5 moles of $Me_2SiCl_2$ at ambient temperature and heating the mixture to 60° C. in order to reduce the amount of dissolved HCl, thus producing an $\alpha,\omega$-dichloropolydimethylsiloxane intermediate fluid having a viscosity of 10.1 centistokes and a weight percent chlorine of 4.3%. Since this intermediate did not meet a specification goal of 3 to 8 centistokes viscosity and 9 to 13% chlorine, 10.5 moles of additional $Me_2SiCl_2$ were added to give a calculated percent chlorine level of 11.5%. This blend of $Me_2SiCl_2$ and chlorosiloxane was heated to 60° C. for four hours. Methanol was added and stirred for one hour at 35° to 45° C. whereupon an immiscible MeOH-HCl phase was removed from the mixture, yielding a methoxy chainstopped polydimethylsiloxane product. This product was stripped at 150° C. and 200 mm Hg pressure to yield a final product with a weight percent methoxy content of 6.8% and a viscosity of 6 centipoise which was within the specification range for the desired end product.

EXAMPLE 2

Added to a reaction vessel were 550 grams of $PhSiCl_3$ and 450 grams of $Me_2SiCl_2$ hydrolyzate which was previously dried with sodium sulfate. The mixture was then heated to 120° C. for 2 hours. Upon cooling to room temperature, a preblend of 191 grams of methanol and 16.4 grams of water was gradually added over a period of approximately 45 minutes. The mixture was then heated to reflux at a temperature of about 68° C. for one hour during which time the temperature rose from 68° to 74° C. The acidity of the mixture was reduced by additions of methanol and by stripping. A final stripping step in the presence of Celite and CaCO$_3$ was made by heating the mixture to 160° C. at 100 mm Hg pressure. Table I depicts the percent methoxy and viscosity of the product made from starting materials PhSiCl$_3$ and the hydrolyzate of Me$_2$SiCl$_2$ (Sample A), as compared to the product of a standard process utilizing PhSiCl$_3$ and Me$_2$SiCl$_2$ (Sample B).

TABLE I

| Sample | Wt. % Methoxy | Viscosity | Yield |
|---|---|---|---|
| A | 14.3 | 24 cps. | 91% |
| B | 14.7 | 30 cps. | 86% |

The product produced by the revised process (Sample A) was within the specification limits for a product prepared by the standard process. Of considerable importance, however, is the improved yield obtained by this revised process.

EXAMPLE 3

A methoxy chainstopped polysiloxane containing PhSiO$_{1\frac{1}{2}}$ and MeHSiO units may be obtained in the following fashion. Added to a reaction vessel containing 234 grams of PhSiCl$_3$ were 106 grams of methanol, the stoichiometric amount needed to form PhSi(OMe)$_3$. The addition was made gradually over a 45 minute interval. Sufficient heat was applied to reflux the mixture at a temperature of approximately 80° C. for about 15 minutes. Nine grams of additional methanol were added and the material was stripped to 100° C. at atmospheric pressure whereupon it was found that the acidity of the mixture was 4600 ppm HCl. To this methoxylated PhSiCl$_3$, which is ostensibly PhSi(OMe)$_3$, were added 133 grams of a stripped hydrolyzate of MeHSiCl$_2$. This mixture was heated at 120° C. for 2 hours. The acidity of the mixture was reduced by twice adding 22 gram portions of methanol and stripping to 100° C. at 100 mm Hg pressure after each addition. The acidity was reduced to approximately 18 ppm HCl, and the material was given a final stripping to 150° C. at 100 mm Hg pressure. This methoxy stopped product containing PhSiO$_{1\frac{1}{2}}$ and MeHSiO units had a weight percent methoxy content of 19.4% and a hydrogen content of 0.5%. The final yield was 94% methoxy-functional product.

A process for preparing a methoxy chainstopped polysiloxane polymer having siloxane units selected from the group consisting of MeSiO$_{1\frac{1}{2}}$, Me$_2$SiO, PhSiO$_{1\frac{1}{2}}$, and Ph$_2$SiO siloxane units and having a viscosity of, approximately, 50 to 200 centipoise at 25° C. and a methoxy content of, approximately, 14 to 17 percent, comprises the steps of charging to a reaction vessel 100 parts of an out-of-specification methoxy chainstopped polysiloxane polymer having siloxane units selected from the group consisting of MeSiO$_{1\frac{1}{2}}$, Me$_2$SiO, PhSiO$_{1\frac{1}{2}}$, and Ph$_2$SiO siloxane units and having a viscosity of, approximately, 200 to 20,000 centipoise and a methoxy content of approximately 5 to 12 percent.

Then, an amount of a blend consisting of MeSiCl$_3$, Me$_2$SiCl$_2$, PhSiCl$_3$, and Ph$_2$SiCl$_2$ effective for adjusting the viscosity and methoxy content of said out-of-specification methoxy chainstopped polysiloxane is added and the mixture is heated to about 110° to 120° C. for approximately 1 to 3 hours.

A mixture of methanol and water is added and the mixture is heated at reflux for approximately 1 to 2 hours, whereupon the reaction mixture is washed with methanol.

If desired, the mixture may then be stripped in the presence of filtering and acid-reducing agents such as Celite and CaCO$_3$ to approximately 140° to 160° C. at approximately 75 to 125 mm Hg.

EXAMPLE 4

To 371 grams of a methoxy stopped polymer comprising PhSiO$_{1\frac{1}{2}}$, Me$_2$SiO and Ph$_2$SiO$_2$ units in equimolar amounts and having a methoxy content of 6 weight percent and a viscosity of 14,000 centipoise was added 62 grams PhSiCl$_3$, 38 grams Me$_2$SiCl$_2$ and 74 grams Ph$_2$SiCl$_2$. The mixture was maintained at 120° C. for two hours. To this was added upon cooling, 65 grams of methanol. The mixture was heated to reflux at 65° to 70° C. and maintained at reflux for one hour, the temperature rising to 79° C. at the end of the reflux period. The reaction mixture was washed with 74 grams of methanol and the methanol-HCl phase discarded. Celite and CaCO$_3$ were added to the methoxysiloxane phase and the slurry stripped to 160° C. at 100 mm Hg pressure and filtered. The product had a methoxy content of 14.3 percent and a viscosity of 145 cps.

The present invention allows for broad process parameters depending on the desired products. For mixtures of about 50 to 80 mole percent PhSiO$_{1\frac{1}{2}}$ and about 20 to 50 mole percent MeHSiO there is utilized an amount of water less than the theoretical amount necessary to hydrolyze the chlorosilanes and an excess amount of methanol.

For mixtures of 0 to 100 mole percent MeSiO$_{1\frac{1}{2}}$, 0 to 100 mole percent Me$_2$SiO, o to 100 mole percent PhSiO$_{1\frac{1}{2}}$ and 0 to 100 mole percent Ph$_2$SiO there is utilized an excess amount of methanol and an amount of water which is less than the theoretical amount necessary to hydrolyze the chlorosilanes.

Thus, for these products, the amount of water determines the chlorine content of the polymers which ultimately determines the methoxy content of the final product.

Thus, it will be seen from the foregoing, that the present invention provides novel and useful processes for reacting chlorosilanes and methoxysilanes with chlorosiloxanes, methoxysiloxanes and siloxanes and is useful in the formulation of methoxy-functional silicone intermediate fluids. Furthermore, it has been demonstrated that the above described reactions can be made to provide final products without the addition of catalytic agents nor the need for cumbersome pressure vessels.

What is claimed as new and desired to be secured by Letters Patent of the United States is:

1. A process for preparing a methoxy chainstopped polydimethylsiloxane polymer having a viscosity of approximately 1 to 5000 centipoise at 25° C., and a methoxy content of approximately 2 to 30 weight percent, comprising:
(a) charging 100 parts by weight (CH$_3$)$_2$SiCl$_2$ to a reaction vessel;
(b) adding approximately 4 to 20 parts by weight of water to form an α,ω-dichloropolydimethylsiloxane intermediate fluid and reducing the concentration of dissolved HCl in a reaction mixture by heating the reaction mixture;
(c) adding an additional amount of (CH$_3$)$_2$SiCl$_2$ effective for adjusting the viscosity and chlorine content of said α,ω-dichloropolydimethylsiloxane intermediate fluid to preselected levels and heating the reaction vessel to, approximately, 50° to 100° C. for, approximately, 4 to 8 hours and;

(d) washing the reaction mixture with methanol and stirring for, approximately, 0.5 to 2 hours at approximately 35° to 40° C., and removing an immiscible MeOH—HCl phase.

2. A process as in claim 1, further comprising the steps of stripping the reaction mixture at, approximately, 120° to 160° C. at, and approximately, 100 to 250 mm Hg pressure.

3. A process for preparing a methoxy chainstopped polysiloxane containing $PhSiO_{1\frac{1}{2}}$ and MeHSiO units, having a viscosity of, approximately, 5 to 40 centipoise at 25° C. and a methoxy content of, approximately, 15 to 22 weight percent comprising:

(a) adding 100 parts by weight of $C_6H_5SiCl_3$ to a reaction vessel containing, approximately, 45 to 48 parts by weight methanol and refluxing the mixture for approximately 10 to 30 minutes;

(b) adding, approximately, 7 to 12 parts additional methanol and stripping the mixture at, approximately, 90° to 120° C. at atmospheric pressure;

(c) adjusting the viscosity and chlorine content of said polysiloxane by adding to the mixture, approximately, 28 to 85 parts by weight of stripped hydrolyzate of $CH_3HSiCl_2$;

(d) heating the mixture for, approximately, 1 to 3 hours at approximately, 110° to 125° C.

4. A process as in claim 3, further comprising the step of stripping the mixture at, approximately, 140° to 160° C. at 50 to 120 mm Hg presure.

5. A process for preparing a methoxy chainstopped polysiloxane polymer having siloxane units selected from the group consisting of $MeSiO_{1\frac{1}{2}}$, $Me_2SiO$, $PhSiO_{1\frac{1}{2}}$ and $Ph_2SiO$ siloxane units and having a viscosity of, approximately, 50 to 200 centipoise at 25° C. and a methoxy content of, approximately, 14 to 17 percent which comprises the steps of:

(a) charging to a reaction vessel 100 parts of an out-of-specification methoxy chainstopped polysiloxane polymer having siloxane units selected from the group consisting of $MeSiO_{1\frac{1}{2}}$, $Me_2SiO$, $PhSiO_{1\frac{1}{2}}$ and $Ph_2SiO$ siloxane units and having a viscosity of, approximately, 200 to 20,000 centipoise and a methoxy content of approximately 5 to 12 percent;

(b) adding an amount of a blend consisting of $MeSiCl_3$, $Me_2SiCl_2$, $PhSiCl_3$, and $Ph_2SiCl_2$ effective for adjusting the viscosity and methoxy content of said out-of-specification methoxy chainstopped polysiloxane;

(c) heating the mixture to about 110° to 120° C. for approximately 1 to 3 hours;

(d) adding a mixture of methanol and water and heating at reflux for approximately 1 to 2 hours;

(e) washing the reaction mixture with methanol.

6. A process as in claim 5, further comprising the steps of stripping the reaction mixture in the presence of filtering and acid reducing agents to, approximately, 140° to 160° C. at, approximately, 75 to 125 mm Hg.

* * * * *